Jan. 3, 1967   W. NUTTING ETAL   3,295,312
TOY CHIMING CLOCK
Filed March 2, 1965   2 Sheets-Sheet 2
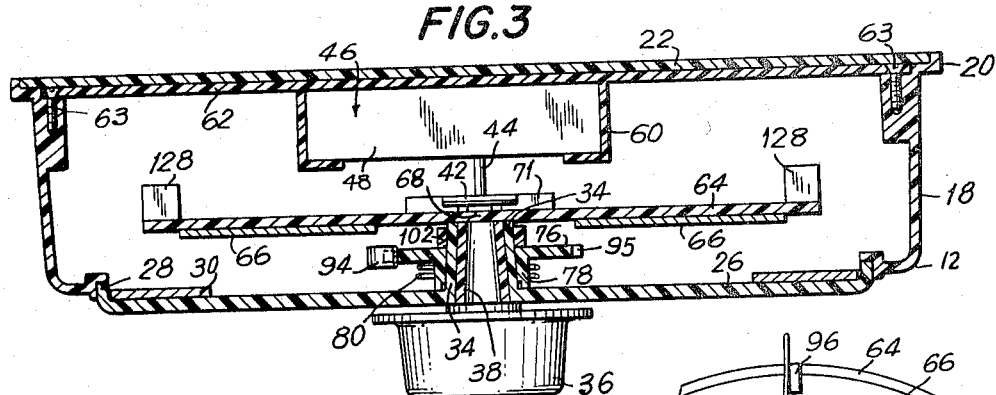
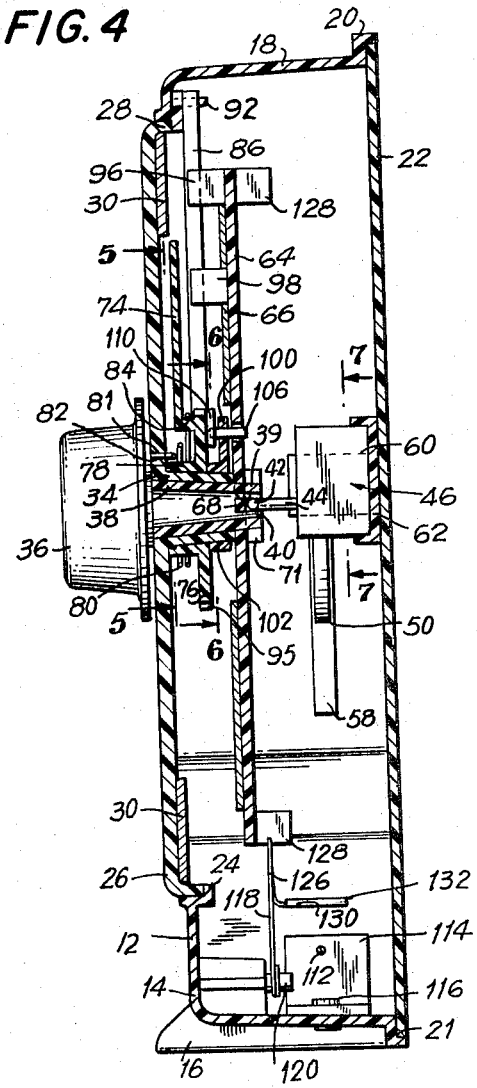
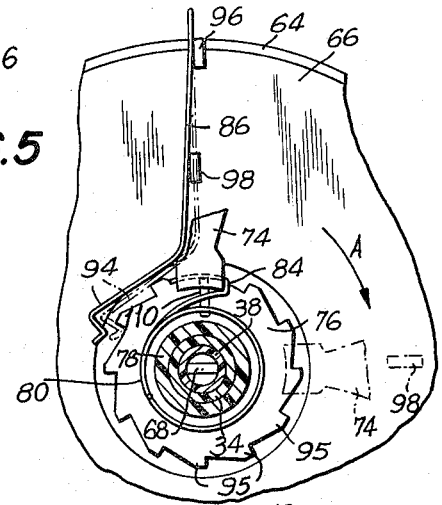
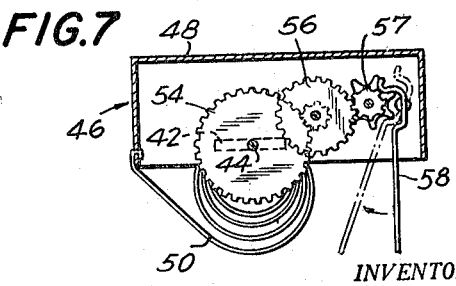
INVENTORS
WILLIAM NUTTING
JOHN JOSLYN
BY
Kinschstein, Kinschstein & Ottinger
ATTORNEYS

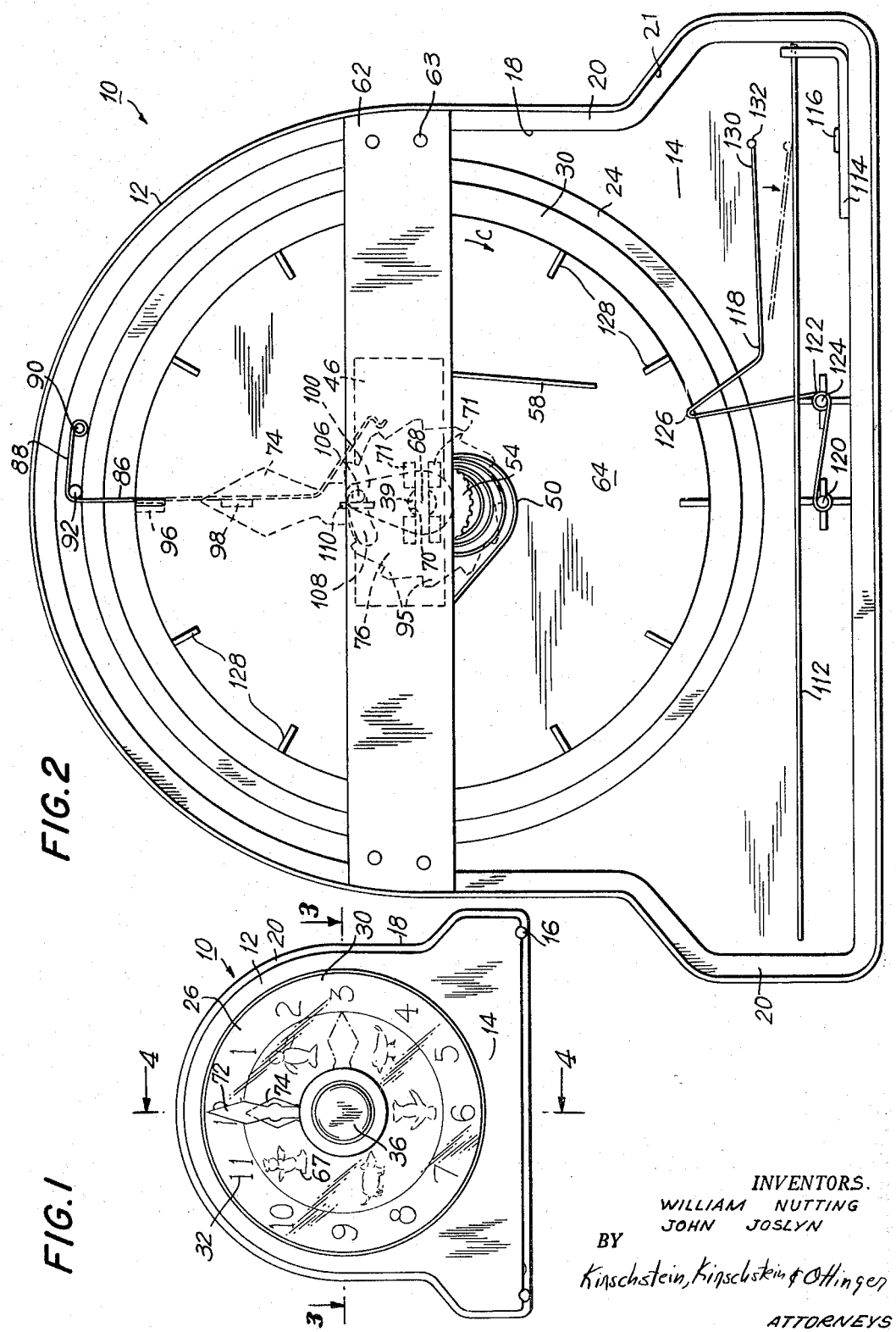

United States Patent Office 3,295,312
Patented Jan. 3, 1967

3,295,312
TOY CHIMING CLOCK
William Nutting, New York, and John Joslyn, Suffolk, N.Y., assignors to Kohner Bros., Inc., New York, N.Y., a corporation of New York
Filed Mar. 2, 1965, Ser. No. 436,582
8 Claims. (Cl. 58—106)

This invention relates to a toy chiming clock.

The primary object of our invention is to provide a toy chiming clock which will be an interesting and amusing plaything for children of tender years and which will teach such children to read the numerals to which the hour hand of a clock points.

It is another object of our invention to provide a toy chiming clock of the character described which will entertain a young child solely by the rendition of consecutive rings of a chime and the siumltaneous rotation of a decorative panel and which, as the child gains sufficient intelligence to read numerals, will teach the child to tell time from a clock.

It is a further object of our invention to provide a toy chiming clock of the character described which will emit a signal as a function of the hour to which the clock is set so that a child receives both visual and oral stimuli which will aid him to comprehend the hour to which the hand of the clock points.

It is yet another object of our invention to provide a toy chiming clock of the character described which permits a child to set the hour hand thereof at any desired horal location and which thereafter emits a striking signal and çauses movement of a decorative panel in response to the action of the child in setting the clock.

It is yet a further object of our invention to make a toy chiming clock of the character described wherein the clock strikes a chime a number of times that is a direct function of the hour at which a manually rotatable hand of the clock has been set so that a child of tender years will audibly receive an indication of the time displayed by the clock.

It is still another object of our present invention to provide a toy chiming clock of the character described which is simple and rugged in construction, attractive to children and adults in form and operation, and which is mass-producible at an economical cost.

It often takes considerable time for a young child to be able to read the time of day as indicated by a clock. This is because time is somewhat of an abstract concept which has no particular interest to a small child. Further, the ordinary clock does not strike the hour and its hands move so slowly that the clock does not stimulate any of the senses of such a child. In order to teach a child of tender years how to read a clock more quickly, we provide a toy chiming clock which has moving ornamentation, which permits a child to set the clock in play as often as he desires, and which will emit a series of clear chime rings of a number that is a function of the time to which the clock has been set. Hence, the clock, beside being an interesting and amusing plaything for a child, will cause him to take interest in the numerals on the clock and will lead him to associate the horal location at which he has set the hand of the clock with a certain number of strokes of a chime whereby he will rapidly become familiar with and be able to read time on a clock.

In general, we provide a toy chiming clock comprising a clock housing and a clock face on which a set of clock numerals is conventionally circumferentially spaced at horal locations. The clock has the usual two hands but in our toy clock, the minute hand may be stationary and the hour hand is mounted for manual rotation in a clockwise direction so that it can be set to any desired horal location. The clock has an internally mounted spring motor which is wound by the said rotation of the hour hand to any horal location. When this rotatable hand is set and released and the hand of the child is removed, the spring motor unwinds and drives an observable decorative disc which is coaxial with the hand and clock face. Rotation of the decorative disc strikes a chime a number of times which number is a direct function of the horal location to which the clock hand has been previously set. The rotatable hand remains stationary at the location at which it has been set until the chiming of the clock has terminated and then the hand rapidly counter rotates to return to its initial 12 o'clock position. The toy is thereupon ready to be again set at the same or any other desired time.

The foregoing and various other objects and advantages of our invention will become apparent to the reader in the following description.

Our invention accordingly consists in the features of construction, combinations of elements, and arrangements of parts which will be exemplified in the toy chiming clock hereinafter described and of which the scope of application will be indicated in the appended claims.

In the accompanying drawings in which is shown one of the various possible embodiments of our invention, FIG. 1 is a front elevational view of a toy chiming clock constructed in accordance with our invention;

FIG. 2 is an enlarged rear elevational view of the clock, with the back cover removed;

FIGS. 3 and 4 are enlarged cross sectional views of the toy chiming clock taken, respectively, along the lines 3—3 and 4—4 as of FIG. 1; and FIGS. 5, 6 and 7 are enlarged fragmentary cross sectional views of the clock mechanism taken, respectively, substantially along the lines 5—5, 6—6 and 7—7 of FIG. 4.

Referring now in detail to the drawings, the reference numeral 10 denotes a toy chiming clock constructed in accordance with the teaching of the present invention. It may be mentioned initially that the several components and parts of the clock except the motor, springs and chime are preferably formed, as appropriate, from any conventional lightweight rigid, synthetic plastic, so that as a whole the clock is light, has no sharp edges, can be easily cleaned, and is well constituted for withstanding long hours of play by young children.

The clock 10 includes a clock housing 12 which contains and supports several of the remaining components of the clock mechanism. Said housing 12 of bell shaped in front elevation and has a configuration similar to that of a mantle clock. The housing includes a broad front wall 14 and has secured thereto two spaced feet 16 which support the clock when the same is placed on a flat surface. The housing 12 also includes a continuous side wall 18 which encircles the housing and which has an outwardly extending flange 20 on its rear periphery that is provided with a shoulder 21 in which is received a flat broad appropriately configured back cover 22. The back cover is fixed to the flange as by gluing and is suitably formed from stiff paperboard.

The broad front wall 14 of the clock housing has a circular opening of large diameter which is defined by a circular radially inwardly extending rim 24 integral with the front wall 14 of the housing.

A circular transparent pane 26 comprises the remainder of the front of the clock 10. Said pane 26 has a circumference 28 which is rearwardly turned and which is received by and secured in an annular shoulder in the circular rim 24. An annular opaque numeral disc 30 is coaxial of and secured to the inner face of the pane 26, the numeral disc 30 constituting the clock face. On the outer face of the disc 30 is imprinted a set of numerals 32 from "1" through "12" which are circumferentially spaced on the disc 30 at conventional horal locations. Said numerals are viewable through the pane 26 by a child playing with the toy clock 10.

Centrally of and integral with the pane 26 is a hollow rearwardly protruding and rearwardly tapering conical bushing 34. A manually rotatable relatively large diameter knob 36 is located externally of the housing 12 and is rotatably carried by the hollow bushing. To this end, a hollow rearwardly tapering conical shaft 38 secured at its front to the knob 36 has an external configuration which rotatably fits within, passes through and is coaxial of bushing 34. At the rear end 39 of the shaft 38, a diametrical slot 40 is formed with its longitudinal axis perpendicular to the axis of rotation of said shaft. The slot 40 engages the T-end 42 (see FIG. 3) of an input/output shaft 44 of a conventional windup spring motor 46. The spring motor is wound up by rotation of the knob 36 and thus the shaft 44 in a clockwise direction and when the motor unwinds it drives the shaft 44 and thus the knob 36 in a counter-clockwise direction.

It is appropriate to note at this point that the term "clockwise" will hereinafter mean rotation as viewed from the front of the clock 10, i.e. clockwise of the clock in FIGS. 1 and 6, and the term "counter-clockwise" will denote the converse direction.

As seen most clearly in FIG. 7, the spring motor 46 includes a rectangular frame 48 to which is fixed at an appropriate location the outer convolution of a coiled leaf spring 50. The inner convolution of the leaf spring 50 is fixed to the shaft 44 that is journaled on the frame 48 and to which is fast a large diameter gear 54. The gear 54 drives a step up gear train 56 to turn a star wheel 57. The star wheel oscillates a pendulum escapement 58. Said escapement governs the winding down speed of the spring motor 46. The escapement 58 also emits a ticking sound as it is driven by the star wheel, said ticking sound imitating the noise of a ticking clock.

The frame 48 is held by a bracket 60 which is fixed to a transverse bar 62 which spans the back of the housing 12 and is secured to the housing as by screws 63. The bar 62 locates the spring motor 46 so that the input/output shaft 44 is coaxial with the bushing 34 and the shaft 38 of the knob 36, and so that the T-end 42 of the shaft 44 is located in the slot 40 in the shaft 38. A rotatable element in the form of an ornamental display disc 64 is mounted for common rotary movement with the shaft 38 and thus with the knob 36. On the face of the disc 64 is superposed an ornamental annular plate 66 which is observable through the transparent pane 26. Fanciful figures 67 (see FIG. 1) which appeal to children of tender years may be imprinted on this plate.

The disc 64 is secured to the shaft 38 for common coaxial rotation by a bar 68 in one piece of the disc, which spans a central aperture 70 in the disc. The bar 68 is received in the same through slot 40 in the shaft 38 in which the T-end 42 of the input/output shaft 44 is located. The rear end 39 of the shaft 38 defining said slot has each of its halves protruding through a different half of the aperture 70 in the disc 64 on each side of the bar 68. To stabilize the T-end 42 of the input-output shaft with respect to the disc 64, four bearing gibs 71 are located on the disc 64 adjacent the aperture 70, two on each side of the slot 40 (see FIG. 2).

The toy clock 10 has two hands, a long minute hand 72 and a short manually rotatable hour hand 74. The minute hand 72 is stationary and may be formed as by painting the same on the pane 26 (see FIG. 1).

The hour hand 74 is mounted for manually actuable rotative movement between an initial position wherein it points at "12," i.e. at the 12 o'clock horal position, and a position at any other horal location wherein it points at the appropriate numeral 32 situated at said location. The hour hand 74 has its radially inward end unitary with another rotatable element constituting a ratchet-toothed index wheel 76 having twelve equiangularly spaced ratchet teeth 95. The index wheel 76 is integral with a forwardly protruding hub which is coaxial with and journaled on the outer surface of the bushing 34. A long coil spring 80 has one of its ends 81 anchored in a pin hole 82 in the transparent pane 26, and its several convolutions loosely wound about the hub 78 of the index wheel 76, its other end 84 being hooked on the rotatable hour hand 74 where it joins the index wheel 76. Said coil spring biases the rotatable clock hand in a counterclockwise direction, and so tends to move the index wheel and thus the hour hand from any horal location back to its initial 12 o'clock location.

A pawl and ratchet arrangement retains the rotatable hour hand 74 in position, after it has been turned so as to be pointed to any desired horal numeral 32. A radially oriented elongated leaf spring 86 has a radially outward end 88 fixed on a lug 90 protruding rearwardly from the top of the housing 12. The leaf spring adjacent said end 88 makes a 90° turn about another lug 92, the same acting as a pivot point for the cantilevered sections of the spring. The radially inward end 94 of the spring is formed into a pawl and the circumference of the index wheel 76 has thereon the twelve ratchet teeth 95 previously mentioned. The pawl and ratchet members are of matching buttress configuration and are oriented to permit clockwise rotation of the index wheel 76 and thus the rotatable hand 74 by the pawl slipping over the teeth in said direction and to normally prevent counter-clockwise movement of horal hand and index wheel, against the force of the spring 80; that is to say, the rotatable hour hand 74 may be rotated in a clockwise direction to any desired hour and will thereafter remain set at said location by the holding action of the pawl.

Facing forwardly and extending from the ornamental disc 64 are two like tabs 96, 98, which tabs will both contact the leaf spring 86 in their path of travel. The tabs are radially spaced, the outer tab 96 being located adjacent the circumference of the disc 64 and the inner tab 98 being located between the circumference and the center of the disc. The inner tab 98 is slightly to the rear of the outer tab 96 in a clockwise direction. When the disc 64 is rotated in a counter clockwise direction by the spring motor 46, the tabs 96, 98 in their rotative paths of travel on the disc 64 both strike the body of the leaf spring 86. The lower and counter clockwise leading tab 98 contacts the spring first and moves the spring and thus its pawl 94 about the pivot 92 until said pawl is clear of the ratchet teeth of the index wheel 76 so as to free said index wheel for counter rotative movement by the coil spring 80. The upper and counter clockwise trailing tab 96 next strikes the leaf spring 86 adjacent its pivot lug and prevents further rotation of the disc 64 beyond this 12 o'clock position.

A one-way drive member 100 connects the knob 36 to the hour hand 74 for common rotation in one direction only, the clockwise direction. Said member, seen in elevation in FIG. 6, constitutes a forwardly protruding hub 102 rotatably mounted on the exterior of the bushing 34 and which locates the drive member on said bushing between the index wheel 76 and the disc 64. Said drive member further includes a crank 104 unitary with the hub 102, which crank fixedly carries a forwardly and rearwardly axially extending pin 106. The rearwardly extending end of the pin 106 is located in a circumferentially disposed arcuate slot 108 in the disc 64 and the disc 64 rotatively drives the member 100 by abutment of the trailing end wall of the slot against the rearwardly extending end of the pin 106.

The index wheel 76 has fixed to its rear surface a rearwardly extending radial tab 110 which contacts the forwardly extending end of the pin 106 in their mutual rotative paths of movement. Said forwardly extending end of the pin 106 is located on the counter clockwise side of the tab 110 so that clockwise rotation of the knob 36, and thus the drive member 100 causes the forwardly extending end of the pin 106 to turn the tab 110 (see solid lines, FIG. 6) in a clockwise direction A. This motion accordingly turns the index wheel and the rotatable hand 74 in the same direction. When the windup spring motor 46 drives the disc 64 in a counter clockwise direction, the other and now trailing end of the slot 108 drives the pin 106 in counter clockwise direction B so that the forwardly extending end of said pin is moved away from the tab 110 and therefore does not drive the index wheel 76. The rotatable hour hand is manually rotatable in a clockwise direction through about a 360° arc, movement beyond this point being prevented by abutment of the tabs 96, 98 against the leaf spring on the counter clockwise side thereof.

The chiming clock further includes a chiming mechanism including an elongated stiff metallic wire sounding element 112 extending across the lower rear portion of the housing. One end of the wire sounding element 112 is secured in an aperture in a bracket 114 which thereby supports the element in a cantilever fashion. The bracket is attached to the side wall 18 of the housing as by a rivet 116. The chiming mechanism further includes a hammer, i.e. a wire striker spring 118, one end of which is secured by coiling the same about a lug 120 protruding rearwardly from the front wall of the housing. Adjacent said end, the spring makes several turns as at 122 about another lug 124, said lug acting as a pivot about which the hammer swings. The middle portion of the hammer 118 is formed into an inverted V-shaped cam having a peak 126 which is in the rotational path of travel of twelve rearwardly protruding regularly circumferentially spaced tabs 128 fixed to the rear surface of the disc 64. The free end 130 of the hammer 118 is capped with a tubular plastic clapper 132 and is located above and in pivotal registry with the sounding element 112. Rotation of the disc 64 in a counter clockwise direction (direction C in FIG. 2) causes the tabs 128 consecutively to energize the hammer, i.e. to engage the peak 126 of the striker spring, to cock said spring by moving the same in a direction away from the sounding element and then, as the tab moves clear of the peak, to release the spring and allow it to sharply strike the sounding element (see dot and dash lines, FIG. 2).

Turning to the operation of our chiming clock 10, the rotatable hand 74 is set to any hour by a child by grasping and rotating the knob 36 in a clockwise direction. Rotation of the knob 36 simultaneously rotates the shaft 38 which is integral therewith and, through the bar 68, the circular disc 64 is also rotated through the same arc in the clockwise direction.

Rotation of the disc 64 through the slot 108 in the disc and the rear end of the pin 106 rotates the drive member 100 since at starting positions (see FIG. 6) the disc is so positioned that the slot 108 holds the pin 106 against the trailing side of the tab 110 when the latter is in its starting 12 o'clock position.

The drive member 100 through the front end of said pin 106 and the tab 110 rotates the index wheel 76 which carries the rotatable hand 74. Hence, rotation of the knob 36 in a clockwise direction through a certain arc (from 0–360°) moves the hour hand in a clockwise direction through a like arc, the hand moving from an initial 12 o'clock location to a position wherein the hand points at any other desired horal numeral 32 on the clock face 30.

Initial movement of the knob 36 from its starting 12 o'clock position in a counter clockwise direction is prevented by the leaf spring 86 which blocks any substantial counter clockwise movement of the tab 96 on the disc 64. The hour hand 74 can be moved as desired clockwise through an arc of not more than 360°, that is to say, from an initial 12 o'clock position to a terminal 12 o'clock position. Movement of the hand more than 360° is blocked by the tab 96 which is stopped from further movement beyond the 360° point by the location of the leaf spring 86 in the path of further clockwise travel of said tab.

The index wheel 76 and thus the hour hand 74 is biased back in a counter clockwise direction from any horal location toward the initial 12 o'clock position by the coil spring 80. The spring is tightened by clockwise rotation of the index wheel relative to transparent plate 26 and said spring biases the index wheel in the opposite direction. In the initial 12 o'clock position of the hour hand and index wheel the coil spring 80 is partially wound up so as at this time to exert a counter clockwise idle biasing torque on the index wheel.

The hand 74 is temporarily retained at the horal location where it is set by the action of the pawl end 94 of the leaf spring 86 on the ratchet teeth 95 of the index wheel. Said pawl and ratchet members are arranged so that the index wheel 76 is free to be driven from the knob 36 in a clockwise direction but the pawl normally prevents counter clockwise rotation of the index wheel against the force of the coil spring 80.

Setting of the hour hand 74 through rotation of the knob 36 simultaneously rotates in a clockwise direction the input/output shaft 44 of the spring windup motor 46 through engagement of the T-end 42 of the shaft by the slot 40 in the end of the shaft 38. This rotation of the shaft 44 stores energy in, i.e. winds up, said motor and as soon as the hand of the child is free of the knob 36, the motor begins to unwind and through its shaft to drive the disc 64 in a counter clockwise direction.

Rotation of the disc rotates the indicia bearing plate 66 fixed to the disc in the same direction and this action can be seen by the child through the transparent pane 26. Rotation of the disc also rotates the knob in the counter-clockwise direction. The speed of the unwinding of the motor 46 is governed by both the load it is driving and by the governing action of the pendulum escapement 58. Said pendulum escapement also emits a ticking noise which imitates the ticking of a conventional windup clock.

It will be recalled that as the disc rotates in a counter clockwise direction, the slot 108 moves the pin 106 and thus the driving member 100 also in a counter clockwise direction and away from the tab 110 on the index wheel. Since the pin no longer abuts said tab, the disc is not engaged to the index wheel when the disc moves counter clockwise.

As the disc is being counter rotated by the unwinding spring motor the clock hand is retained in place by the leaf spring pawl 94. As the disc counter rotates, it strikes a chime a number of times, which number is a direct function of the horal location at which the hand is set. As the disc rotates counter clockwise, the striker spring 118 has its peak 126 repetitively hit by the tabs 128 on the back of the disc, the number of tabs passing by the peak being dependent upon the arc through which the disc has been rotated, i.e. the position to which the hour hand has been rotated and set. As each tab consecutively comes into contact with the peak, it also moves the peak in a counter clockwise direction (as viewed in FIG. 2) against the force of the spring and thereby cocks said spring. As the tab continues its movement, it moves clear of said peak, releasing the spring and allowing the clapper 132 on the free end 130 of the spring to sharply strike the sounding element 112 whereby to emit a chiming sound. As each tab in turn moves by the spring, it causes another and similar sounding stroke of the chime, so that a number of chime strokes is emitted, which number is the same as the horal location to which the hour hand 74 has beet set.

It may be mentioned incidentally that although the tabs 128 also abut the peak of the spring when the disc is rotated initially in a clockwise direction, this moves the clapper 132 relatively slowly into contact with the sounding element, not sufficiently rapidly to sound the same.

After the disc has sounded the chime a number of times indicative of the horal location at which the hour hand was set, said disc approaches its initial 12 o'clock position. As it does so, the lower tab 98 on the front face of the disc contacts and moves the leaf spring and so moves the pawl end 94 thereof out of contact with the ratchet teeth 95 of the index wheel. When said pawl end is clear of said teeth, the coil spring 80 is free to rapidly move the index wheel in a counter clockwise direction and thus return to its initial position the hour hand that has remained stationary while the chimes were being struck. Further movement of the disc is prevented by abutment of the outer tab 96 on the disc against a relatively rigid portion of the leaf spring 86 near its zone of support. Thereafter, the chiming clock is ready to have its hand set again.

It will be observed that if the pin 106 were integral with the disc 64, and the crank 104 and the slot 108 were omitted, so that the one-way drive existed directly between said pin 106 and the tab 110, operation of the clock would be satisfactory for all settings of the hour hand from its initial 12 o'clock position up to an 11 o'clock position. However, if in the absence of the crank and slot the hour hand should be turned 360° back to a 12 o'clock position, the mechanism of the clock would jam on release of the knob because when the disc is turned counterclockwise, the pin 106 would strike the reverse side of the tab 110 to halt return movement of the disc 64 before the inner tab 98 could shift the pawl 94 to its ratchet releasing position. Hence, the hour hand would not snap back to its initial position and the chime would only sound eleven times. Such jamming is prevented by the lost motion that is permitted to take place between the disc 64 and the pin 106 due to the provision of the crank 104 and the slot 108. Thereby, the disc can, on its return movement, turn through 360° plus the length of the slot 108 minus the diameter of said pin; this suffices to complete the twelfth chime and to deactivate the holdback action of the pawl 94. The pin 106 is restored to its proper initial stationary position, caught between the then trailing edge of the slot 108 and the tab 110 by the return sweep of said tab 110 that is activated by the coil spring 80. Such return sweep will continue until the tab 110 presses the pin 106 against the trailing edge of the slot 108, further retrograde movement of the slot and disc 64 being prevented by the abutment of the outer tab 96 against the spring 86.

It thus will be seen that we have provided a device which achieves the several objects of our invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described our invention, we claim as new and useful and desire to secure by Letters Patent:

1. A toy chiming clock comprising a clock face, a set of clock indicia circumferentially spaced at horal locations on the clock face, a clock hand, a first rotatable element carrying the clock hand, a second rotatable element rotatably mounted coaxially of said first element, means drivingly engaging the second element to the first element for common rotation only in the clockwise direction, manually operable means for turning the second element and thus the first element so that the hand rotates in a clockwise direction from an initial 12 o'clock location through not more than about 360° to any desired one of the horal locations, spring means biasing the first element and thus the hand for counterclockwise rotation from said desired horal location to said initial location, means releasably retaining the first element and thus the hand at said horal location, a windup spring motor having an input/output shaft, said motor being wound by clockwise rotation of said shaft and when unwinding driving said shaft in the counterclockwise direction, means securing the second element to the shaft for common rotation whereby rotation of the manually operable means winds said motor and unwinding of the motor rotates the second element in a counterclockwise direction, a sounding element, a hammer mounted to strike so as to sound said element, means carried by the second element for repetitively driving the hammer only upon counterclockwise rotation of the element to its initial 12 o'clock position so as to sound said element a number of times indicative of the horal location at which the clock hand is retained, and means carried by the second element for releasing the retaining means only after the second element rotates to its initial 12 o'clock location and the emission of sounds from the sounding element has terminated.

2. A toy chiming clock as set forth in claim 1 wherein the means carried by the second element for striking the hammer comprises twelve regularly circumferentially spaced protrusions on said element, each of said protrusions contacting the hammer in its rotative path of travel.

3. A toy chiming clock as set forth in claim 1 wherein the means engaging the second rotatable element to the first rotatable element includes a lost motion connection.

4. A toy chiming block comprising a clock face, a set of clock indicia circumferentially spaced at horal locations on the clock face, an hour hand, a rotatable ratchet-toothed wheel carrying said hour hand, a swingable pawl biased into engagement with the ratchet teeth of the wheel and in engaged position permitting rotation of said wheel in a clockwise direction only, a coil spring biasing the wheel for rotation in a counterclockwise direction, a rotatable disc coaxial of the wheel, a windup spring motor having an input/output shaft, a one-way drive crank interposed between the wheel and the disc and carrying a pin, the disc having a circumferentially oriented arcuate slot adapted to engage one end of the pin, the wheel carrying a tab located in the clockwise path of travel of the other end of the pin, a manually rotatable knob having a shaft coaxial of and drivingly interengaging the disc and the input/output shaft of the motor so that rotation of the knob in a clockwise direction winds up the spring motor, rotates the hour hand through the one-way drive crank and the wheel from an initial 12 o'clock position to any other desired horal location and rotates the disc through a like arc, a sounding element, a hammer mounted to strike the element, twelve regularly circumferentially horally spaced tabs carried by the disc, each tab located to contact the hammer to strike the sounding element in only its counter-clockwise path of rotation on the disc, so that as the motor unwinds, the disc counterrotates and the tabs thereon cause the element to emit a series of sounds of a number indicative of the horal location to which the hour hand has been set, a tab carried by the disc and in its path of rotation therewith located to release the pawl from the ratchet teeth when the disc has counterrotated back to its initial position, whereby the coil spring will thereupon rapidly counterrotate the wheel and thus the hour hand back to its initial position, and means retaining the disc and hour hand in their initial positions when they have been restored thereto.

5. A toy chiming clock comprising a clock face, a set of clock indicia circumferentially spaced at horal locations on the clock face, a rotatable hour hand, a manually operable means for turning the hand from an initial 12 o'clock location through an arc of not more than 360° to any desired one of the horal locations, means temporarily retaining said hand at said horal location, means emitting a series of sounds of a number the same as the value of the horal location at which the hand is retained while the hand is so retained, and means for automatically counter-rotating the hand in a single movement without pause to return it to its 12 o'clock initial location upon the termination of the emission of the series of sounds and without the emission of a further series of sounds during said movement.

6. A toy chiming clock as set forth in claim 5 wherein the hand is rotated in a clockwise direction from its initial 12 o'clock location to the horal location at which it is retained, and the hand is rotated in a counterclockwise direction in returning from the horal location at which it is retained to its initial 12 o'clock location.

7. A toy chiming clock as set forth in claim 5 wherein the counter-rotating means includes a wind-up spring motor mounted in the clock, and means operatively connecting the motor to the hand, the motor being wound up when the hand is rotated from its initial 12 o'clock location to the location at which it is temporarily retained, a sound emitting element, another element drivingly engaged by the spring motor, and means mounting the element to repetitively operate the sound emitting element, the spring motor driving the element after the rotatable hand is set so that said series of sounds is emitted.

8. A toy chiming clock comprising a clock housing, a clock face, a set of twelve clock indicia circumferentially spaced at horal locations on the block face, a rotatable hour hand, manually operable means for turning the hand from an initial 12 o'clock location in a clockwise direction through an arc of not more than 360° to any desired one of the horal locations, a wind-up spring motor mounted in the housing, means operatively connecting the motor to the hand so that the motor is wound up when the hand is rotated in a clockwise direction, means driving the hand in a counter-clockwise direction after it is brought to any desired horal location, a stop preventing rotation of the hand in a counter-clockwise direction beyond its 12 o'clock initial position, a pendulum escapement operatively connected to the motor and driven by the motor as the motor winds down, said escapement when driven emitting a ticking sound, means for emitting a series of sounds of a number the same as the value of the horal location to which the rotatable hand is rotated, a transparent pane in the housing, a disc bearing decorative indicia, observable through the pane from the front of the clock, said disc being rotatably mounted in the housing and engaged to the hand, the motor driving the disc in a counterclockwise direction during the emission of the series of sounds and as the motor winds down, said sound emitting means comprising twelve uniformly circumferentially spaced tabs carried by the disc, a percussive sounding element, a hammer including a clapper and a cam, means pivotally mounting the hammer with the clapper when in a position of repose near by but spaced from the percussive sounding element and with the cam in the path of travel of the disc-carried tabs, means biasing the hammer to its position of repose, the tabs as the motor is wound up upon movement of the hand from the 12 o'clock location turning with the disc and successively passing and engaging the cam and upon each such engagement pressing the clapper slowly towards the percussive element without sounding the same, and said tabs as the motor winds down and the disc moves in a counterclockwise rotation successively engaging the cam and upon each such engagement cocking the hammer so as to move the clapper away from the sounding element, storing energy in the biasing means and then releasing the hammer so that the biasing means sharply moves the hammer so that its clapper smartly strikes the sounding element so as to sound the same.

References Cited by the Examiner
UNITED STATES PATENTS

| | | | |
|---|---|---|---|
| 646,805 | 4/1900 | Clayton | 58—21.13 |
| 875,112 | 12/1907 | Sanders | 58—21.13 |
| 1,441,389 | 1/1923 | Vincent | 58—106 |
| 2,631,386 | 3/1953 | Zalkind | 35—39 |

RICHARD B. WILKINSON, *Primary Examiner.*

GERALD F. BAKER, *Examiner.*